(12) United States Patent
Rubio

(10) Patent No.: US 10,080,143 B2
(45) Date of Patent: Sep. 18, 2018

(54) METHOD OF PLACING AN ANTENNA OF A RADIO ACCESS NETWORK (RAN) ASSET IN A WIRELESS COMMUNICATION NETWORK

(71) Applicant: ClearSky Technologies, Inc., Orlando, FL (US)

(72) Inventor: Alberto E. Rubio, Bolingbrook, IL (US)

(73) Assignee: ClearSky Technologies, Inc., Orlando, FL (US)

( * ) Notice: Subject to any disclaimer, the term of this patent is extended or adjusted under 35 U.S.C. 154(b) by 0 days.

(21) Appl. No.: 15/210,161

(22) Filed: Jul. 14, 2016

(65) Prior Publication Data

US 2017/0019797 A1    Jan. 19, 2017

Related U.S. Application Data

(60) Provisional application No. 62/194,182, filed on Jul. 17, 2015, provisional application No. 62/361,141, filed on Jul. 12, 2016.

(51) Int. Cl.
*H04W 16/18* (2009.01)
*H04L 12/24* (2006.01)
(Continued)

(52) U.S. Cl.
CPC .......... *H04W 16/18* (2013.01); *G06K 9/0063* (2013.01); *G06K 9/00476* (2013.01);
(Continued)

(58) Field of Classification Search
CPC .... H04W 16/18; H04W 24/10; G06K 9/4638; G06K 9/036; G06K 9/0063; G06K 9/00476; H04L 41/145
See application file for complete search history.

(56) References Cited

U.S. PATENT DOCUMENTS

| 6,289,203 B1 | 9/2001 | Smith et al. |
| 2003/0023412 A1 | 1/2003 | Rappaport et al. |

(Continued)

FOREIGN PATENT DOCUMENTS

WO    2011/053328 A1    5/2011

OTHER PUBLICATIONS

Petar S. Medovic et al., "Softwares for Urban Electromagnetic Wave Propagation Modeling", INFOTEH-JAHORINA, vol. 11, pp. 422-427, Mar. 2012.

(Continued)

*Primary Examiner* — Chuong A Ngo
(74) *Attorney, Agent, or Firm* — GrayRobinson, P.A.; Donald S. Showalter

(57) ABSTRACT

An antenna of a network asset may be placed at a location determined based on a signal quality analysis carried out using a clutter object data set characterizing the influences of real world objects present in an area on signal propagation. The clutter object data set may be generated based on a set of clutter object data files each of which corresponds to a respective type of real world object. Clutter object data files may be generated based on an image of the area and each includes data representing the positions of pixels having a spectral characteristic indicative of the corresponding object type. The object clutter data set may include information derived from the object data files according to a relative hierarchical order of object types.

26 Claims, 21 Drawing Sheets

(8 of 21 Drawing Sheet(s) Filed in Color)

(51) Int. Cl.
    *G06K 9/00*         (2006.01)
    *H04W 24/10*     (2009.01)
    *G06K 9/03*         (2006.01)
    *G06K 9/46*         (2006.01)

(52) U.S. Cl.
    CPC ........... *G06K 9/036* (2013.01); *G06K 9/4638* (2013.01); *H04L 41/145* (2013.01); *H04W 24/10* (2013.01)

(56) References Cited

U.S. PATENT DOCUMENTS

2008/0280565 A1* 11/2008 Jevremovic ........... H04W 16/20
                                                                     455/67.7
2010/0103868 A1* 4/2010 Meng .................... H04W 16/18
                                                                     370/328
2012/0007982 A1* 1/2012 Giuffrida ............... G01C 11/02
                                                                     348/144

OTHER PUBLICATIONS

International Search Report dated Oct. 21, 2016.
Written Opinion of the International Searching Authority dated Oct. 21, 2016.
International Preliminary Report on Patentability dated Jan. 23, 2018, in counterpart International Application No. PCT/US2016/042397.

* cited by examiner

Land use clutter classes

1 - High Density Urban
 2 - Commercial / Industrial
 3 - Residential with Trees
 4 - Residential with Few Trees
 5 - Agriculture
 6 - Open
 7 - Transportation
 8 - Airport
 9 - Forested
 10 - Marsh
 11 - Water Object clutter classes
- Inner wall 5
- Inner wall 4
- Inner wall 3
- Inner wall 2
- Inner wall 1
- Building
- Water Body
- Road
- Trees
- Grass
- Open

Fig. 13

Land use clutter classes

1 - High Density Urban
 2 - Commercial / Industrial
 3 - Residential with Trees
 4 - Residential with Few Trees
 5 - Agriculture
 6 - Open
 7 - Transportation
 8 - Airport
 9 - Forested
 10 - Marsh
 11 - Water Object clutter classes Inner wall 5
 Inner wall 4
 Inner wall 3
 Inner wall 2
 Inner wall 1
 Building
 Water Body
 Road
 Trees
 Grass
 Open

METHOD OF PLACING AN ANTENNA OF A RADIO ACCESS NETWORK (RAN) ASSET IN A WIRELESS COMMUNICATION NETWORK

CROSS-REFERENCE TO RELATED APPLICATIONS

This application claims priority under 35 U.S.C. § 119(e) to commonly owned, U.S. Provisional Application Ser. No. 62/194,182 filed Jul. 17, 2015, for all commonly disclosed subject matter. This application also claims priority under 35 U.S.C. § 119(e) to commonly owned, U.S. Provisional Application Ser. No. 62/361,141 filed Jul. 12, 2016, for all commonly disclosed subject matter.

STATEMENT REGARDING FEDERALLY SPONSORED-RESEARCH OR DEVELOPMENT

Not Applicable.

INCORPORATION BY REFERENCE

U.S. Provisional Application Ser. No. 62/194,182 and U.S. Provisional Application Ser. No. 62/361,141 are each expressly incorporated herein by reference in their entireties to form part of the present disclosure.

FIELD OF THE INVENTION

The invention relates to the field of communications networks of types in which communications are carried wirelessly in a least a portion of the network. More particularly, the invention relates to a method for placing the antenna of an asset of such network.

BACKGROUND

To enable users of cellular phone networks and other wireless communication networks to communicate reliable over the network using a cell phone, smart phone, iPad®, notebook or other wireless communication device using network assets, such as by way of non-limiting example repeaters and/or cellular base stations, including either full size (i.e. "macro") base stations and/or so-called "small cells". Such assets have antennae positioned at locations selected to provide network coverage and at least adequate wireless signal strength and network coverage. In the absence of adequate signal strength in a particular area, wireless communications to or from that area may be hampered, unreliable or impossible. Placing antennae of network assets at judiciously selected locations can often eliminate such areas or at least reduce their size and/or improve the signal strength available in them. Since considerable expense is entailed in the acquisition, installation, operation and maintenance of such network assets, it is desirable to position such assets strategically so that an accurately predicted signal strength and coverage can be provided in regions within an area of interest.

Limitations on wireless signal strength, and thus network coverage, are imposed as a result of path loss. Path loss refers to the attenuation (i.e. reduction in power density) of an electromagnetic wave as it propagates along a signal path. A wireless signal undergoes path loss in part because the wave front of the signal expands in size as distance from the antenna of its transmission source increases. In addition to the distance from the transmitter antenna, a variety of physical phenomena may also contribute to path loss including for example reflection, refraction, diffraction and/or absorption of the wireless signal. Path loss is significantly influenced by factors such as topography and nature of the environment in the signal path (urban or rural, vegetation and foliage). The ability to estimate or predict path loss as accurately as possible is important in designing, planning, operating, maintaining, troubleshooting, repair, upgrading and/or reconfiguring of wireless communication systems in an economically efficient manner.

Propagation modeling software tools capable of analyzing path loss, signal strength, interference and/or coverage in a particular geographic region are commercially available and in the prior art. An example of such a software tool is the signal propagation modeling tool distributed under the trade name Atoll, such as Atoll 3.3, available from the Chicago, Ill. of Forsk Société à Responsabilité Limitée which is based in of Blagnac, France. Another example of such a tool is the RF network planning and optimization platform distributed by Infovista S.A. of Les Ulis, France under the trade name Mentum Planet. Particulars of such propagation modeling tools, and how to make and use them are well known in the prior art and need not be explained in here detail beyond noting that one of the data inputs necessary in order to use such propagation modeling software tools to carry out a signal quality analysis, such as a path loss analysis, signal strength analysis and/or network coverage analysis, and one which is crucial to the accuracy of such determinations, is input data characterizing what is generally referred to in the trade as "clutter".

According to prior art methods of placing an antenna of a radio access network (RAN) asset, the location of the antenna is determined based on a coverage analysis, path loss analysis, signal strength analysis or other type of signal quality analysis in which the clutter data relied upon in carrying out the analysis have been typically been made up either entirely, or at least in major part, of a plurality of so-called "cutter classes" of a type representing generalized standard definitions of land uses such as those indicated on land use maps. Examples of such land use clutter classes may include for example "dense urban", "urban", "suburban", and "rural". Each particular land use clutter class is assigned a universal value for each given propagation parameter, such as attenuation per unit distance of signal travel, in that particular land use clutter class. Thus, according to a signal quality analysis carried out based on land use clutter classes, the inventor has recognized that a wireless signal would virtually always be predicted to undergo less attenuation per unit distance travelled through a suburban environment than through a dense urban environment and would likewise virtually always be predicted to undergo less attenuation per unit distance travelled through a rural environment than through a suburban environment.

By way of example, FIG. 1 and FIG. 14 show satellite images of the earth encompassing an example area of interest. FIG. 2 is a color-coded map showing the land use clutter classes of the same area of the earth as that shown in FIG. 1 and FIG. 3 is a legend identifying individual land use clutter classes designated according to the color scheme used in FIG. 2. Correspondingly, FIG. 15 is a non-color coded map showing the land use clutter classes of the same area of the earth as that shown in FIGS. 1 and 14 and FIG. 12 is a legend identifying individual land use clutter classes designated according to the non-color coding scheme used in FIG. 15. FIG. 4 is color-coded map illustrating the result of a signal quality analysis, in this example a coverage analysis, carried out for portions of a wireless communication network located within the same area as that represented in FIGS. 1 and 2 based on the land use clutter classes of FIG. 2 and FIG. 5 is a legend useful for interpreting the color coding scheme used in FIG. 4. Correspondingly, FIG. 17 is non-color coded map illustrating the result of a signal quality analysis, in this example a coverage analysis, carried out for portions of a wireless communication network located within the same area as that represented in FIGS. 14 and 15 based on the land use clutter classes of FIG. 15 and FIG. 18 is a legend useful for interpreting the non-color coding scheme used in FIG. 17.

As can be appreciated from FIGS. 4 and 5, the regions of highest predicted signal strength and thus, good performance, are those depicted in red. Regions predicted as having successively lower strengths, and thus successively lower performance, are depicted in FIG. 4 in dark orange, light orange, yellow, light green, dark green, light blue and dark blue, respectively. In the example illustrated by FIG. 4, regions depicted in red are generally centered within yellow regions correspond to the locations of the antennas of three cellular base stations which happen to exist in the example area of interest. In order to improve coverage by adding an additional radio access network (RAN) asset, such as a repeater or an cell base station, regions potentially suitable as a location an antenna of the asset as determined according to the prior art would typically include at least those shown in blue in the example of FIG. 4 and would typically exclude those shown in red, yellow and green in that example. FIGS. 17 and 18 are non-color counterparts of FIGS. 4 and 5 respectively.

SUMMARY OF THE INVENTION

The invention recognizes that the influences acting on a wireless signal propagating through a real would signal path are significantly less homogeneous than those represented by conventional land use clutter classes. For example, a particular region classified under a land use clutter class of "dense urban" may in reality be made up of a combination or subcombination particularly sized, shaped and located types of real world objects such as buildings, trees, grass, roads and/or others. These objects each influence a signal differently, yet all are characterized identically under a land use clutter class. Since a wireless signal does respond to human definitions of land use such as "dense urban" but does respond to real world objects present in the vicinity of its path it is desirable to place an antenna of a network asset at a location determined based on a signal quality analysis carried out using a clutter data set which characterizes clutter more accurately than a land use clutter class.

In certain embodiments, an antenna for a radio access network (RAN) asset is placed at a location determined based on a signal quality analysis carried out using a clutter data set representing a set of real world objects capable of influencing propagation of a radio signal such as, for example, water bodies, trees, grass, buildings, paved roads and bare ground. In certain embodiments, the clutter data set may represent at least (i) the position of each pixel of a pixel array of an aerial view image of an area of the earth and (ii) an object type designation for each pixel.

In certain embodiments, the clutter data set may be represented in a clutter raster file. This is particularly advantageous because data formatted as a raster file is readily loaded into commercially available signal propagation modeling tools such as those noted further above.

In certain embodiments, the clutter data set may be generated using information derived from a set of object raster files.

In certain embodiments, a set of object raster files may be generated based on an aerial view image of an area of the earth. Each of the object raster files may correspond to a respective type of real world object of a set of different types of capable of influencing propagation of a radio signal. Each one of the object raster files may represent a position of each pixel of a pixel array representative of the image and may also represent an association between a subset of said pixels and an affirmative designation, that subset including only those only those of the pixels which have a spectral characteristic which meets at least a first criterion, indicative of a particular one of said types of objects to which that particular object raster file corresponds. The clutter data set may be generated based on information derived from the object raster files and the antenna placed at a location determined based on the result of a signal quality analysis carried out using the clutter data set. In certain embodiments the signal quality analysis may comprise a path loss analysis, a signal strength analysis and/or a coverage analysis. In certain embodiments the spectral characteristic may comprise color. In certain embodiments the spectral characteristic may comprise a grayscale value.

In certain embodiments, a clutter data set may be generated based on information derived from said object raster files according to hierarchical relative order.

In certain embodiments, a respective object type designation may be determined for each respective pixel of the array by associating a first object type designation with each pixel which positionally corresponds to a pixel associated with an affirmative designation according to whichever one of the object raster files which ranks highest according to the hierarchical relative order and successively associating a different object type designation with each pixel of whichever one of the remaining object raster files which ranks next highest according to the hierarchical relative order.

According to a further aspect of the invention, at least one conditional test may be applied to further in prove accuracy by effectively eliminating the effect of pixels determined, based on the test, are not be ones depicting the particular type of real world object as to which those pixels may have at least initially associated with an affirmative designation. In certain embodiments, such pixels may be effectively disassociated from such affirmative designation based on a result of such conditional test. In certain embodiments such conditional test may be applied before generating the object clutter data set.

In certain embodiments, the conditional test may comprise a neighborhood analysis according to which a probability that a pixel of interest associated with an affirmative designation according to a given one of the object raster files is or is not a pixel representing the particular type of real world object to which that given object raster file corresponds may be represented by a value correlated to what proportion of pixels present in a group of pixels located within a defined proximity of the pixel of interest are associated with the affirmative designation and effectively disassociating the pixel of interest from the affirmative designation in the event that value does not meet a certain threshold.

In certain embodiments, the conditional test may comprise a sieve analysis according to which clusters of pixels associated with an affirmative designation per a given one of said object raster files are evaluated with respect to a total area occupied by each respective one of said clusters and all pixels of each cluster which does not satisfy an area threshold condition are effectively disassociated from the affirmative designation.

In certain embodiments, the conditional test may comprise a both a sieve analysis and a neighborhood analysis. In certain of those embodiments, the neighborhood analysis may be carried out before the sieve analysis as doing so has been found to provide unexpectedly good results.

These foregoing and other aspects of various embodiments of the invention will be readily apparent to a person of ordinary skill in the art upon review of the following detailed description together with review of the appended drawings wherein like reference numerals are used to denote like items and wherein the various Fig. of the drawings are as briefly described below

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 13 is a legend useful for interpreting the color-coding used in FIG. 12.

DETAILED DESCRIPTION OF PREFERRED EMBODIMENTS

Figure 6:
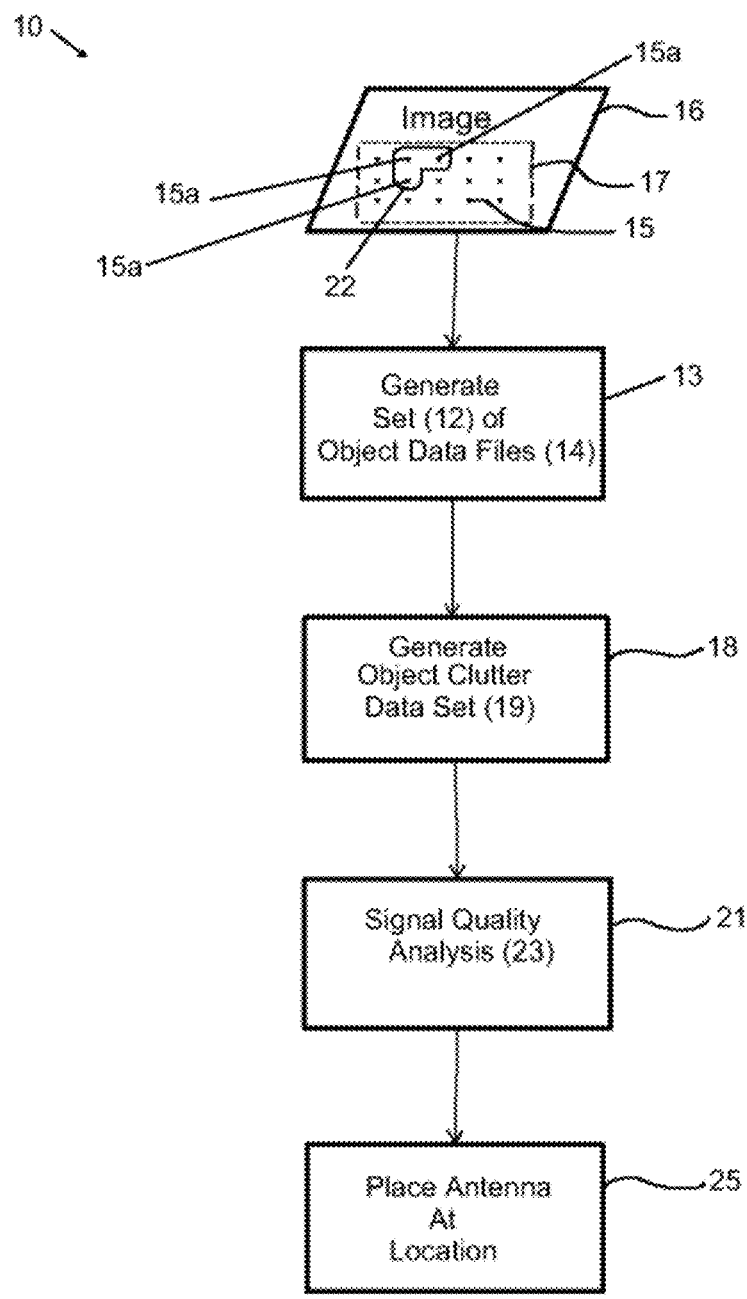
FIG. 6 is a schematic block diagram illustrating certain embodiments of the method of the invention.
Figure 7:
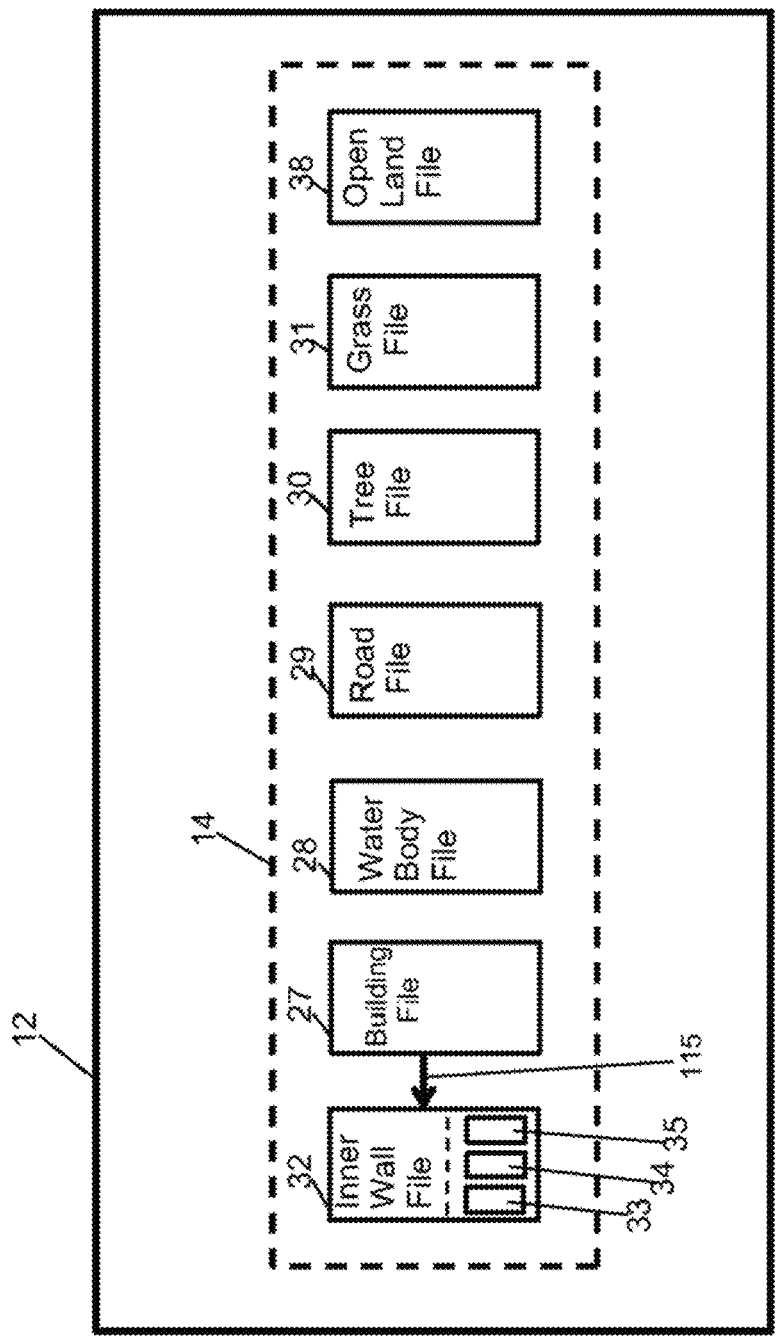
FIG. 7 is a schematic block diagram illustrating an example of a set of object data files.

Referring now to FIGS. 6 and 7, certain embodiments of a method 10 according to the invention may comprise a step 13 of generating a set 12 of object data files 14 based on an image 16, preferably an aerial view image 16 of an area of the earth. As used herein, the term "aerial view" may include without limitation a view taken from a vantage pint such as a satellite, aircraft, drone, balloon, spacecraft or any other any suitably elevated vantage point. As used herein, the term "image" includes, but is not limited to limited to, two-dimensional images or to images represented or embodied in a visually perceptible form but also may include two-dimensional and/or three-dimensional images and images represented as data from which the image may or may not be visually perceptible without the aid of a computer or other device.

Each respective object data file 14 included in set 12 includes information specifying the a position of each pixel 15 of a pixel array 17 representing the area depicted by the image 16 as well as information indicating which of those pixels 15, if any, are ones depicting a given type of real world object capable of influencing propagation of a radio signal. In a step 18, a clutter data set 19 may be generated based information derived from at least some, and preferably all, of the object data files 14 through processing carried out according to a hierarchical relative order of object types as will be explained in further detail below. In a step 21, a signal quality analysis 23 is carried using the object clutter data set 19 and in a step 25, an antenna of a cell base station, a so called "mini cell", a repeater or other asset of a radio access network (RAN) is physically placed at a location determined based on a result of signal quality analysis 23.

As used herein, the term "signal quality analysis" may comprise any analysis which is based at least in part on a characterization of clutter and generates a result useful for determining a location suitable as a location for an antenna of a radio access network (RAN) asset, including without limitation any type known in the art for analyzing path loss, signal strength, interference and/or coverage. Step 21 can be, but need not be carried out using a propagation modeling software tool, including but not limited to any of those particular propagation modeling software tools noted above in the Background section of this document.

In some embodiments, image 16 may be a grayscale image but in more preferable embodiments, image 16 may be a color image, most preferably, a true color image. Image 16 may be, but need not necessarily be, a digital image. Image 16 may be represented in any form or media including but not limited to types which are readily humanly viewable such as in hardcopy and/or on a display and/or one in the form of a dataset from which image 16 may or not be humanly viewable, at least without the aid of a machine. In certain embodiments, image 16 may be one which is at least substantially orthorectified and is preferably capable of providing a resolution equal to or greater than two (2) pixels per meter. In certain embodiments resolution of at least about one (1) pixel per meter is used. Orthorectified imagery suitable for use as image 16 is readily available from various government and private sector sources. By way of non-limited example, image 16 may suitably comprise satellite imagery such as orthorectified satellite imagery available from the TerraServer division of Precisionhawk, Inc. located in Raleigh, N.C. If orthorectified imagery is not available for a given area of interest, image orthorectification should be carried out as a preliminary step (not shown).

If an original image 16 is not already in the form of a desired pixel array 17, in certain embodiments, the step 13 of generating a set 12 of object data files 14 based on an aerial view image 16 of an area of the earth may include or be preceded by a step (not shown) of generating a first raster file based on image 16. The first raster file representing each pixel of a pixel array derived from the image and include information specifying a position of each pixel of that array and a value quantifying a spectral characteristic of each pixel of that array. In such embodiments, at least one or more of the object data files 14 may be generated based on the first raster file. Such step may be useful for example if image 17 not already a pixelated image and/or if image 16 encompasses more than the area of interest and/or if an original image is made up of more spectral information than necessary. In the latter instance, pixels within a range of values of a spectral characteristic in the image may be associated with a single value of a spectral characteristic in the first raster file, thereby allowing subsequent processing to proceed more readily. For example, a range of redish tones in an image may be represented by an arbitrary single tone in the first raster file. Digital scanning and/or other well-known image processing techniques can be used to carry out such step which need not be described in further detail.

Each individual object data file 14 in the set 12 may correspond to a respective given type of real world object capable of influencing propagation of a radio signal of a type used in a communication network of interest. As shown in FIG. 7, in certain embodiments, set 12 may include by way of non-limiting example, a respective object data file 14 for each of one or more of the following real world object types: buildings, water bodies, roads, trees, grass, and open land. In FIG. 7 such files may be labelled respectively as a building file 27, a water body file 28, a road file 29, a tree file 30, a grass file 31 and an open land file 38. In certain embodiments, signal propagation effects of inner walls of a building may be taken into account by including at least one inner wall file 32 in the set of object data files.

It is to be understood that the particular types of objects selected for representation in a corresponding object data file 14 may vary from one embodiment to another depending on the needs of a particular application. For example in placing an antenna of a RAN asset in a communication network located in the Antarctic, there would be little benefit including an object data file 14 denoting grass. Even if a given type of object is one which may be present in a given area of interest, a corresponding object data file may be absent or not used, if for any reason such type of object is not likely to have a significant impact on signal propagation that area, for example, if an area being considered is in the midst of a desert, it may be possible depending on circumstances to forego inclusion and/or use of a water body object file if no water bodies of significant extent are present in the area. Accordingly certain embodiments may utilize a respective object data file 14 corresponding to one or more respective additional types of real world objects of other than those noted herein. Likewise, certain embodiments may omit or not utilize a respective object data file 14 corresponding to one or more of the particular types of real world objects noted herein.

Each respective object data file 14 included in the set 12 of object data files 14 includes information specifying the a position of each pixel 15 of a pixel array 17 depicting the area of interest shown in image 16 as well as information indicating which of those pixels 15, if any, are in a subset 22 of pixels depicting substantially only the particular type of real world object to which that particular object raster file 14 corresponds. Except for any object data file 14 corresponding to inner walls of buildings, and in some embodiments, the further possible exception of an object data file 14 corresponding open land and/or types of real world objects not corresponding to any other particular object data file being used, the aforementioned subset 22 of pixels can be determined for object data files 14 corresponding to other types of real world objects, including by way of non-limiting example, trees, grass roads and buildings in a manner which will now be described, In certain embodiments, the pixels 15*a* within the subset 22 may be those having a spectral characteristic which meets at least a first criterion. In some embodiments, the spectral characteristic may comprise a grayscale value and the first criterion may be one according to which pixels 15*a* are identified based on whether they are of a particular grayscale value and/or are within a particular range of grayscale values. In some embodiments, the spectral characteristic may comprise one correlated to color and the first criterion may comprise one according to which pixels 15*a* are identified based on whether they are of a particular color and/or are within a particular range of colors. Those skilled in the art will appreciate that color can, if desired be represented according to wavelength and that a range of colors can be represented as a range of wavelengths.

In some embodiments, inner wall file each object data file 14 may be in the form of a raster file in which the position of each pixel 15 in the array 17 is represented, and in which any and all ones of the pixels 15*a* is associated with an affirmative designation. In example, in certain embodiments pixels 15*a* in a particular object data file 14 may be associated with such affirmative designation by being coded with particular value and all others of the pixels 15 of that particular object data file 14 may not be coded and/or may be coded with one or more values distinguishable from the particular value just mentioned. By way of non-limiting example, in certain embodiments such value by which pixels 15*a* may be associated with an affirmative designation may be a first binary value and those remaining pixels 15 not in subset 22 may be coded with an opposite binary value.

Some embodiments may utilize at an object data file 14 corresponding to open land, such a file being represented in FIG. 7 as open land file 38. An open land file 38 may suitably be generated in the manner as described above, but with first criterion being one is selected to be one indicative of open land based on the spectral characteristic.

As an alternative, in certain embodiments an open land file 38 may be generated irrespective of whether or not particular pixels 15 have a spectral characteristic that meets an aforementioned first criterion. Rather, in such embodiments, some or all of the pixels 15a associated with an affirmative designation according to an open land file 38 may be determined by default as being those not associated with an affirmative designation according to any of the other object data files to be used to generate the object clutter data set 19.

Figure 9:
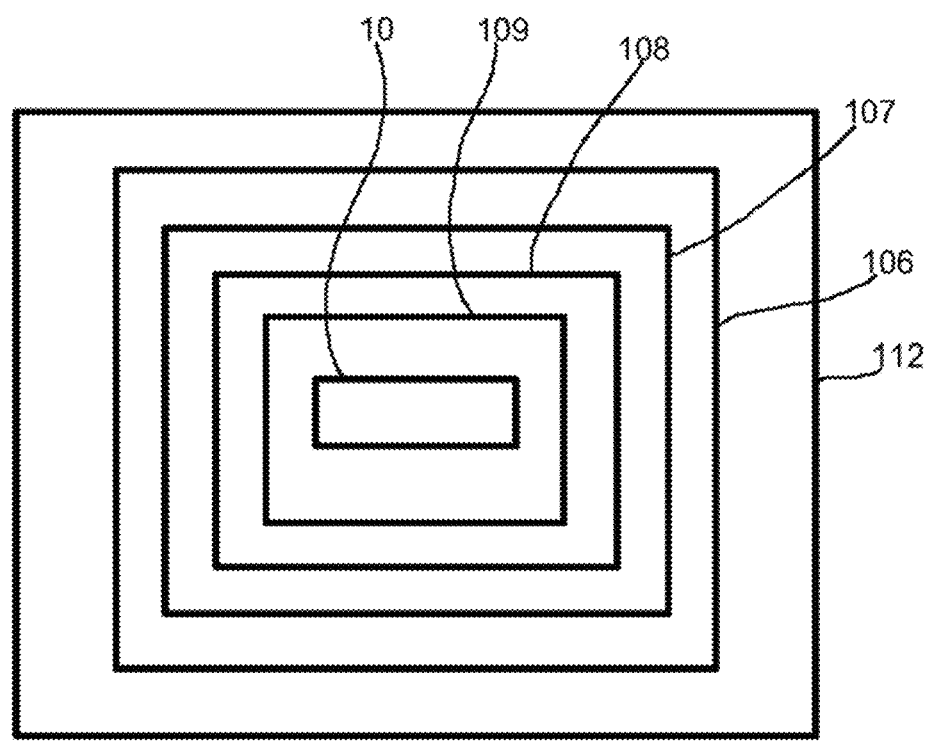
FIG. 9 is a schematic diagram illustrating an model arrangement of inner walls within a building.
Figure 10:
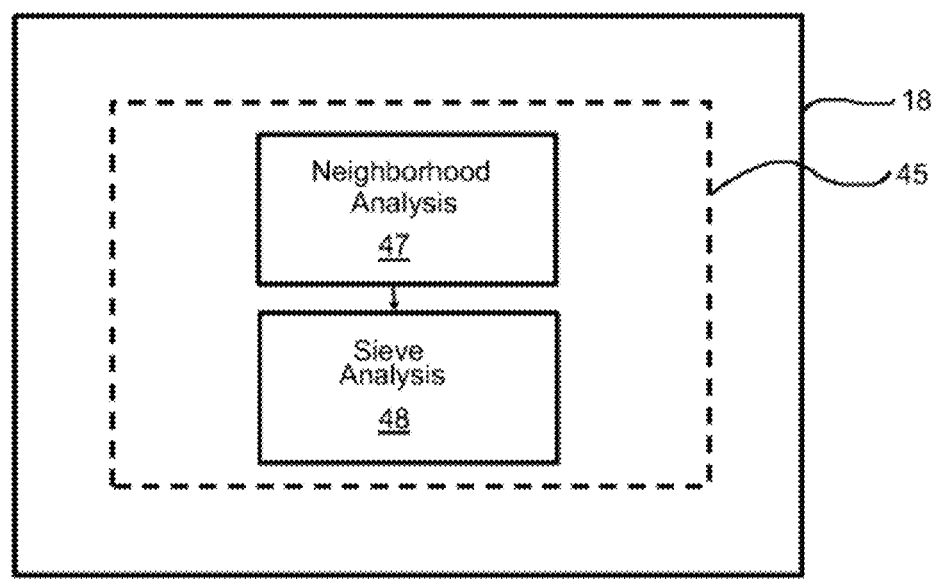
FIG. 10 is a schematic diagram illustrating certain embodiments including one or more conditional tests in the nature of a neighborhood analysis and/or a sieve analysis.

In certain embodiments the step 18 of generating the object clutter data set 19 may include the substep of applying at least one conditional test and effectively disassociate particular ones of the pixels 15a of at least one of the object files 14 from the affirmative designation based on a result of said at least one conditional test 45. As indicated in FIG. 9, in certain embodiments such conditional test 45 may include a neighborhood analysis 47. In certain embodiments such conditional test may include a sieve analysis 48. In certain embodiments such conditional test 45 may include both a sieve analysis 48 and a neighborhood analysis 47. In certain embodiments neighborhood analysis 47 is carried out prior to a sieve analysis 48.

A neighborhood analysis 47 may be applied to improve accuracy and may be any analysis according to which a probability that each affirmatively designated pixel 15a of given one of the object data files 14 is one truly representing said type of real world object to which said given one of said object data file corresponds. Such probability may be evaluated by determining a value quantifying what proportion of a group of all pixels 15 located within a defined proximity of the particular affirmatively designated pixel 15a being evaluated is made up of affirmatively designated pixels 15a In certain embodiments pixel being evaluated interest may effectively disassociated from the affirmative designation in the event that value is below a threshold value.

By way of a non-limiting example, of a neighborhood analysis 47, a particular object data file 14 may be in the form of a raster file in which pixels 15a associated with an affirmative designation have a binary pixel value of one (1) and all other remaining ones of the pixels 15 in that file 14 have a binary pixel value of zero (0). The number of pixels 15a within a window encompassing a given total number of pixels 15 may be counted. The higher the count, the higher is the probability that a pixel 15a of interest centered on the window designates the type of object to which file 14 corresponds is correctly classified. The pixel 15a of interest may be effectively dissociated from its affirmative designation by, for example recoding the its binary value as a zero, if the count does not meet a threshold number. In certain preferred embodiments, a window of seven by seven (7×7) pixels may be used. Using a 7×7 window may entail an analysis wherein the binary values of forty nine (49) pixels 15 surrounding the pixel 15a of interest may be summed. The maximum possible sum value of all nine (49) pixels 15 surrounding the pixel 15a of interest may fifty (50) be in the analysis output for the pixel of interest. The higher the sum value, the higher the probability that surrounding pixels are correctly classified. The lower the value, the lower the probability that the pixel 15 a of interest is correctly classified. A probability function may be used recode the file 14 to assure that an affirmative designation remains is associated only with pixels 15 a of a sufficiently high sum value. This may be carried out for example using an "if . . . then" conditional algorithm.

A sufficiently high probability in a particular case may be considered to be, for example, seventy five percent 75%. Based upon the previous neighborhood analysis the highest probability that can be achieved using a 7×7 neighborhood window is (7×7)+1=50. The 75% percent value of 50 is 50*0.75=37.5. As such, a value of 37.5 may be used as the threshold value based on which conditional probability recoding may be carried out. The corresponding "if . . . then" condition may then be carried out as:

"if (pixel value)>=37.5 then (newpixelvalue)=1 otherwise (newpixelvalue)=0"

where
pixelvalue=the neighborhood output pixel being analyzed
newpixelvalue=The new recoded output pixel value Applying a sieve analysis 47 may also be useful improve accuracy. Since at least certain types objects have little signal propagation significance unless they are sufficiently large, a sieve analysis 47 may be one according to which clusters of pixels 15a associated with an affirmative designation according to a given one of the object data files 14 is evaluated with respect to a total area occupied by each respective one of the clusters and all said pixels 15 of each of said clusters which do not satisfy an area threshold condition are effectively disassociated from the affirmative designation. A sieve function 47 may selectively recode this pixels 15a within clusters based on the size of the cluster. e in nature we can tell the raster processing software to eliminate or sieve all groups of pixels who's size falls below a threshold for typical clutter sizes. Non-limiting examples of respective sieve thresholds which may be used for at least certain types of objects are listed below:

Water Body—recode clusters of less than at least about twenty thousand (20,000) square meters.
Road Segment—recode clusters of less than about forty thousand (40,000) square meters.
Trees—recode clusters of less than about seventy five (75) square meters
Grass—recode clusters of less than about seventy five (75) square meters.

In certain embodiments a sieve analysis may be carried out by recoding clusters of pixels 15 within a respective object data file 14 in accordance with the algorithm illustrated below:

If $cwsize > Sv$ then $Cv=1$ else $Cv=0$

Where:
Cwsize=grouped size of the clutter pixels in square meters;
Cv=binary pixel value;
Sv=Sieve parameter for clutter class of interest As noted above, in certain embodiments, the set 12 of object data files 14 may optionally include at least one such file representing interior walls of buildings. Accounting for the signal propagation effects affords further improvements in accuracy of signal strength determinations, and resulting further improvement of accuracy of the determination an appropriate location for placement of an antenna. In FIG. 7, such a first object data file 14 is labeled as inner wall file 32. In certain embodiments, a set 12 may include two or more such object data files 14, each representing a different respective category of interior walls of buildings. For example, FIG. 7 shows that in certain embodiments the set 12 of first object files 14 may include at least a first inner wall file 33 representing building inner walls of a first category and at least one additional inner wall file, 34 and/or 35, each representing building inner walls of a different respective category.

In some embodiments, a category of interior walls may be categorized based on material, thickness and/or other inherent physical property giving rise to signal propagation characteristics warranting distinct consideration. In some embodiments, a category of interior walls may be one corresponding to their absolute location and/or their location relative to some other part of a building, such as for example the exterior perimeter of the building or other walls inner of the building. For example, in some embodiments, a first inner wall file 33 may correspond to a category of inner walls located closest in a horizontal direction to the exterior of a building and one more additional inner wall files 34, 35 may correspond to respective categories of inner walls located successively further from the exterior of a building in such horizontal direction.

It is to be noted that although FIG. 7 shows inner wall files 34, 35, and 34 within the boundaries of the box designating inner wall file 32, such is solely for convenience of illustration and is not to be construed as implying or requiring that any of inner wall files 33, 34, and/or 34 must constitute a sub-file of inner wall file 32. While such may permissibly be the case in certain embodiments, those skilled in the art will recognize in light of the present disclosure that such sub-file is arrangement is not necessary and that various alternatives can be used, including without limitation, constituting any or all inner wall files 32, 33, and 34 as separate and/or distinct files or representing one or more of them as a sub-file of one or more others of them.

One non-limiting example of a way that at least some such inner wall category information could be determined would be to generate the corresponding first object file 14 based at least in part on information gained from an inspection of one or more particular buildings and/or plans or diagrams of such buildings. At least some inner wall location information of substantial signal propagation significance can be determined without necessity of such inspections in a manner which will now be described with reference to FIG. 8.

Figure 8:
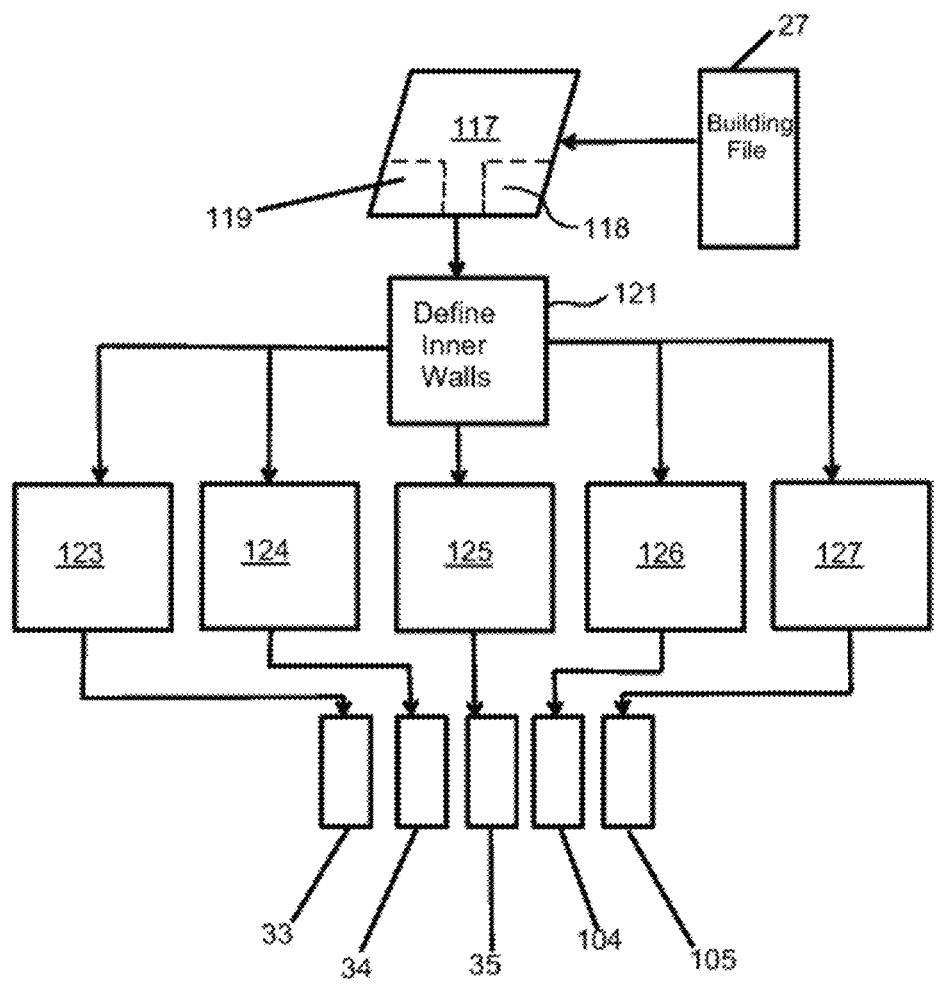
FIG. 8 is a schematic diagram illustrating generation of object data files in the nature of inner wall files.

An example of process useful for characterizing inner walls (i.e. interiorly located walls) of buildings of interest 112 is illustrated in FIG. 8, inner walls may be represented as one or more object data files 14 of types referred to herein for convenience as inner wall files, which in certain most preferred embodiments may each be in raster format. Inner wall files may include at least a first inner wall file 33. Certain embodiments may also include any arbitrary number of additional inner wall files such as one or more of, a second inner wall file 34, a third inner wall file 35, a fourth inner wall file 104, a fifth inner wall file 105. As illustrated in FIG. 9, inner wall files 34, 34, 104 and 105 may correspond respectively to a first inner wall 106, a second inner wall 107, a third inner wall 108, a fourth inner wall 109 and a fifth inner wall 110, whose respective perimeters are polygons nested one inside another and whose respective sides run parallel to one another and to sides of a polygon representing the shape of the outline of the roof of a each respective building of interest as projected onto the plane of the image of the earth. As Fig. B shows, inner walls may be nested successively, such that the perimeter of the fifth inner wall 110 is located the furthest distance away from the exterior of the building 112 and the perimeters of the fourth inner wall 109, third inner wall 108, second inner wall 107 and first inner wall 106, are located successively shorter distances from the exterior perimeter of building 112.

In certain embodiments, inner wall files for each given building of interest 112 may be derived based on data 117 which may include data 118 which describes the two-dimensional outline of each building of interest 112 and data 119 which describes the height of respective each building of interest 112. In certain embodiments, at least data 118 may conveniently be represented in the form of one or more vector files. In certain embodiments, data 118 may be extracted from the building file 27 as indicated by the arrow 115 in FIG. 7 and FIG. 8. Some or all of data 117 can be created in any desired manner but data 117 is also available commercially. For example building vector outlines with height data are commercially available from a sources such as the TerraServer division of Precisionhawk, Inc. located in Raleigh, N.C.

In certain embodiments, one or more, and preferably each of, inner walls 106 through 110 is defined according to a step 121 as will now be described. The sizes of hallways running between inner walls may be accounted for by defining inner walls in a manner which accounts for hallways between inner walls. A separation between adjacent ones of inner walls 106 through 110 due to hallways may in certain embodiments be accounted for by approximating inner wall locations based on a percentage of area of a building of interest 112 having a perimeter of a particular shape and/or size. Defining inner walls may if desired be carried out using a standard buffer function available in commercially available GIS (geographic information systems) software tools such as the tool known as "Erdas Imagine" available from Hexagon Geospatial based in Norcross, Ga. The buffer function creates a polygon that is offset by a certain size as defined by the user from an original polygon. In certain embodiments, Equation 1 below can be used to determine the buffer distances (in meters) that will be used to define inner walls 106 through 110.

By way of non-limiting example, first inner wall 106 may be offset inside the perimeter of building 112 outlines by one meter by using a buffer value of "−1 m".

Inner walls 107 through 110 may be offset by respective buffer values which may, in certain embodiments, be determined as a ratio of the total area of the building 112 relative to the size of a typical hallway for a building 112 of such size. Respective buffer values which may be used for defining the second through fifth inner walls, 106 through 110, may be calculated as:

$$Bv = \text{Integer}(\text{sqrt}(AREA)/Wr)*-1 \qquad \text{Equation 1}$$

Where:
Bv=buffer value to be used;
AREA is the area contained within the polygon exterior of the building;
Integer is an integer of the value derived;
sqrt is the square root function;
and Wr=ratio value to be used depending on the wall that is being constructed.

By way of non-limiting examples, for the second inner wall 107, Wr may equal twelve (12); for third inner wall 108, Wr may equal six (6); for fourth inner wall 109, Wr may equal four (4), and for fifth inner wall 110, Wr may equal two point five (2.5).

The result of step 121 for a given building of interest 1112 may be a set of polygons which includes one or more polygons 123, 124, 125, 126 and/or 127 each respective one of which corresponds to an respective one of inner walls 106 through 110, each polygon being offset from the exterior polygon of building 112 by a distance determined in the manner explained above. In certain embodiments, polygons 123, 124, 125, 126 and/or 127 may be represented in the form of vector files as polygon vector data. Once any and all applicable inner walls 106 through 110 have been defined for each building 112 of interest within the area of the earth encompassed by the image, the corresponding first, second, third, fourth and fifth inner wall files 33, 34, 35, 104, and 105 may be generated by combining the polygon data representing each respective one of inner walls 106 through 110 for all buildings 112 of interest into a respective inner wall file 33, 34, 35, 104 and 105 each of which may preferably be in the form of a raster file in which the position of each pixel in the image of the area of the earth is represented, and in which any and all ones of the pixels which positionally correspond to a respective inner wall is associated with an affirmative designation. For example, in certain embodiments, in first inner wall file 33, any pixel thereof within a subset of pixels having a respective raster position corresponding to a location on any first inner wall 106, present in any and every building 112 of interest, may be associated with such affirmative designation by being coded with a particular value and all other pixels of the first inner wall file 33 not the subset just mentioned may be coded with one or more different values.

By way of non-limiting example, in certain embodiments such value representing an affirmative designation may be a first binary value and pixels not in the subset may be coded with an opposite binary value. Respective subsets of pixels whose positions correspond to respective locations on other respective ones of said inner walls 107, 108, 109, 110 may be associated with an affirmative designation in a like manner in respective ones of the other inner wall files 34, 35, 104 and 105. While inner wall files 33, 34, 35, 104 and 105 may be in any other suitable format, in embodiments which are most preferred. Any and all inner wall files 33, 34, 35, 104 and 105 are preferably raster files in which the position of each pixel in the array representing the image of the earth area of interest is represented in the raster and the value of each respective pixel therein is determined in a manner as described in this paragraph.

A object clutter data set 19 may be generated in a step 18 based on information derived from all of the object data files 14. In certain embodiments, a respective object type designation may be determined for each respective pixel of the array by associating a first object type designation with each pixel which positionally corresponds to a pixel associated with an affirmative designation according to whichever one of the object raster files which ranks highest according to the hierarchical relative order and successively associating a different object type designation with each pixel of whichever one of the remaining object raster files which ranks next highest according to the hierarchical relative order.

In certain embodiments, the object clutter data set 19 is represented in the form of a raster file. In preferred embodiments, the step 18 of generating the object clutter data set 19 is carried out by deriving information from the object data files 14 according to a hierarchical relative order of according to the type of real world objects to which those object data files 14 correspond. A preferred hierarchical relative order (as listed in order from highest-ranked being first to lowest ranked being listed last) is:
1. Fifth Inner Wall File 105
2. Fourth Inner Wall File 104
3. Third Inner Wall File 35
4. Second Inner Wall File 34
5. First Inner Wall File 33
6. Building File 37
7. Water Body File 28
8. Road File 29
9. Tree File 30
10. Grass File 31
11. Open Land File 38

Step 18 may be carried out in certain embodiments in accordance with an algorithm that will now "if . . . then" conditional algorithm as described below:
If (Iw5=1) then Pv=1 otherwise if (Iw4=1) then Pv=2 otherwise if (Iw3=1) then Pv=3 otherwise if (Iw2=1) then Pv=4 otherwise if (Iw1=1) then Pv=5 otherwise if (Ir=1) then Pv=6 otherwise if (Water Body=1) then Pv=7 otherwise if (Roads=1) then Pv=8 otherwise if (Tree=1) then Pv=9 otherwise if (Grass=1) then Pv=10 otherwise Pv=11
Where:

Pv is an object type designation by which, in the present example, a numeral 1 denotes a fifth inner wall 110, a numeral 2 denotes a fourth inner wall 109, a numeral 3 denotes a third inner wall 108, a numeral 4 denotes a second inner wall 107, a numeral 5 denotes a first inner wall 106, a numeral 6 denotes a building 112, a numeral 7 represents a water body, a numeral 8 represents a road, a numeral 9 represents a tree, a numeral 10 represents grass and a numeral 11 represents open land.

Iw5=fifth inner wall file 105 binary pixel value (1=true, all other=false).

Iw4=fourth inner wall file 104 binary pixel value (1=true, all other=false)

Iw3=third inner wall file 35 binary pixel value (1=true, all other=false)

Iw2=second inner wall file 34 binary pixel value (1=true, all other=false)

Iw1=first inner wall file 33 binary pixel value (1=true, all other=false)

Ir=building file 27 binary pixel value (1=true, all other=false)

Water=water body file 28 binary pixel value (1=true, all other=false)

Road=road file 29 binary pixel value (1=true, all other=false)

Tree=tree file 30 binary pixel value (1=true, all other=false)

Grass=grass file 31 binary pixel value (1=true, all other=false)

In the above example, "true" corresponds to being associated with an affirmative designation and false corresponds to not being associated with an affirmative designation.

Once the object clutter data set 19 has been generated, a signal quality analysis step 21 is carried out in which the object clutter data set 19 is used to represent clutter based on a value quantifying at least one signal propagation parameter for each object type designation. For example, one signal propagation parameter used in any signal quality analysis will be attenuation and an attenuation value representative of a given object type will be used for such object in carrying out the analysis. As noted above, signal quality analysis may comprise any one or more of: a path loss analysis, a signal strength analysis, an interference analysis and a coverage analysis. Except that the characterization of clutter upon which signal analysis 21 is based uses an object clutter data set 19 generated in accordance with method 10, the step 21 may be a signal quality analysis carried out in an otherwise conventional manner and therefore need not be described here in further detail. However, as an example of carrying out signal quality analysis 21 using a propagation modeling software tool one may assign a propagation model within the propagation modeling software to use the object clutter data set 19 by performing the following within the propagation modeling software:
1. Instruct the propagation modeling software that buildings are objects having a height extend from ground level to a height z where z is the building height
2. Identify trees as a clutter class n and height z where z represents average tree height in the area (in meters) and n represents the raster row id which gives x and y location of the pixel identified as trees.
3. Identify water and grass as clutter classes n and m respectively with height 0 m where n represents raster row id for grass and m represents raster row id for water and x and y location of the pixels for each obstruction category 4. Identify all inner walls as cluster classes m, n, o, p, and q where m is $5^{th}$ wall, n is $4^{th}$ wall, o is $3^{rd}$ wall, p is $2^{nd}$ wall, and q is first wall of the corresponding raster row identifier.

5. Assign an appropriate propagation model and assign attenuations based on the real world object types represented in the object clutter data set 19.

Figure 11:
FIG. 11 is color-coded map illustrating the result of a signal quality analysis carried out for portions of a wireless communication network located within the same area shown in FIGS. 1 and 2 based on object clutter classes.
Figure 19:
FIG. 19 is a non-color counterpart of FIG. 11, namely, a color-coded map illustrating the result of a signal quality analysis carried out based on object clutter classes for portions of a wireless communication network located within the same area shown in FIGS. 14 and 15.

Once the propagation model has been assigned and attenuations specified for each object type represented in the object clutter data set 19 the software can represent the results of the signal quality analysis 21 in a map such as the coverage maps of FIG. 11 and FIG. 19 and/or can generate maps for path loss, signal strength and/or interference at a resolution of greater than or equal to about five meters per pixel. If desired the results of analysis 21 can optionally be filtered according to signal strength, path loss, coverage and interference to optionally generate a map showing only locations at which any of such are above or below a threshold that is deemed suitable.

Figure 1:
FIG. 1 is a color satellite image of the earth encompassing an example area of interest.
Figure 2:
FIG. 2 is a color-coded map showing the land use clutter classes within the same area shown in FIG. 1.
Figure 3:
FIG. 3 is a legend useful for interpreting the color-coding used FIG. 2.
Figure 3:
Figure 3:
Figure 3:
Figure 3:
Figure 3:
Figure 3:
Figure 3:
Figure 3:
Figure 3:
Figure 3:
Figure 4:
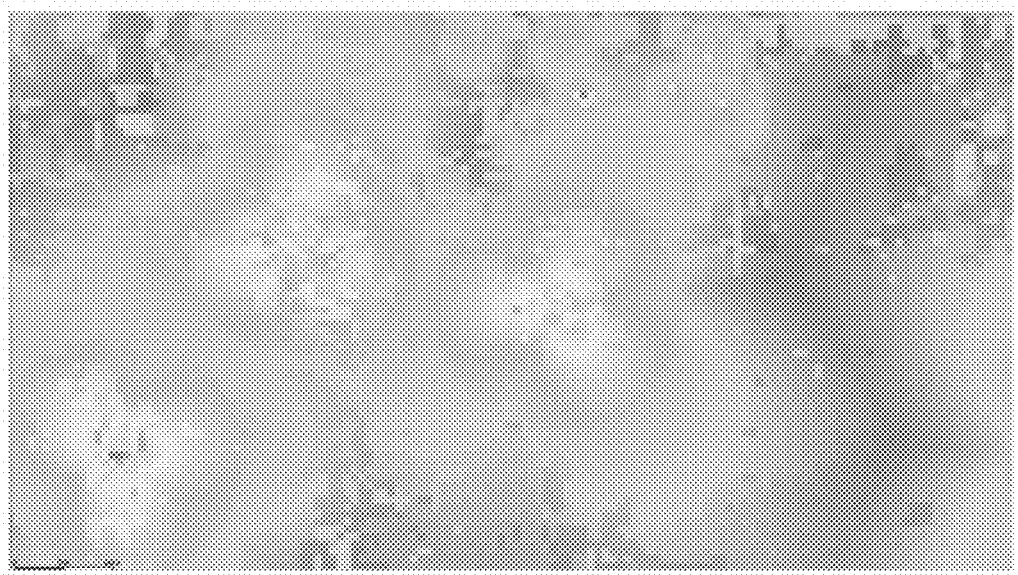
FIG. 4 is color-coded map representing the result of a signal quality analysis carried out for portions of a wireless communication network located within the same area shown in FIGS. 1 and 2 based on the land use clutter classes of FIG. 2.
Figure 5:
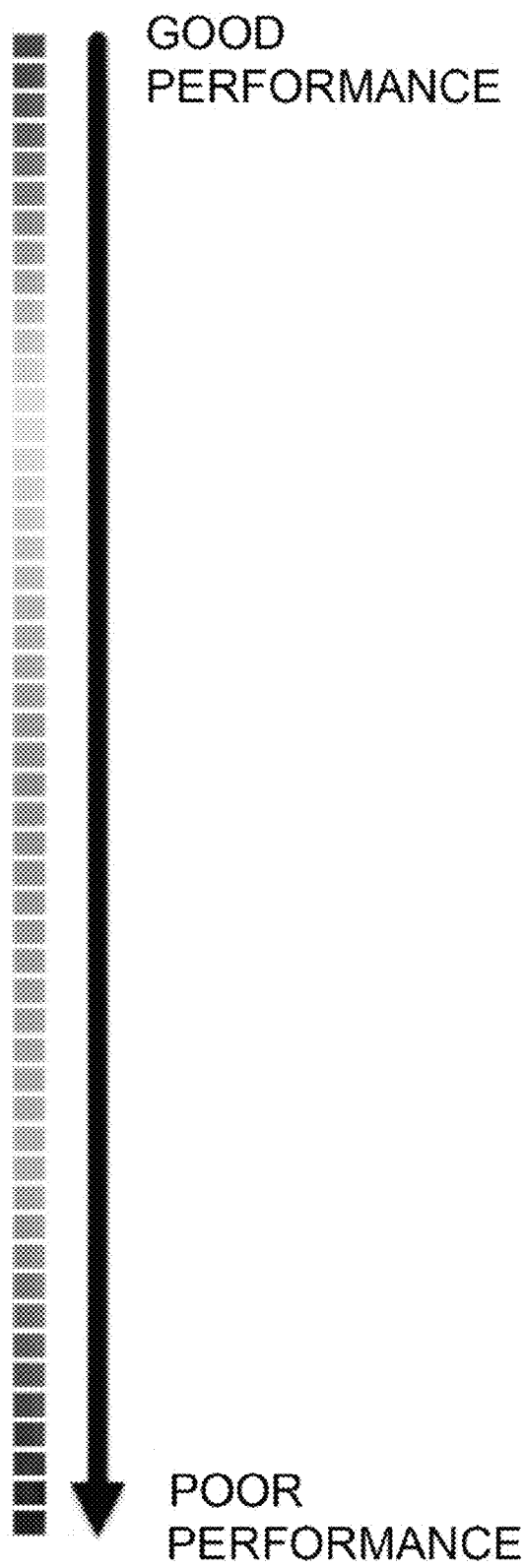
FIG. 5 is a legend useful for interpreting the color coding scheme used in both FIG. 4 and in FIG. 11 below.
Figure 12:
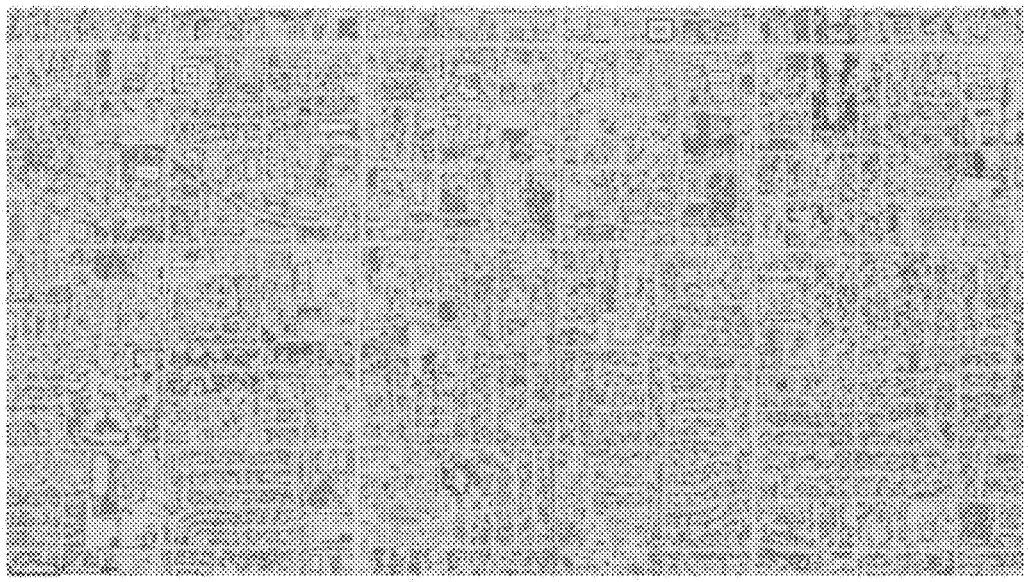
FIG. 12 is a color image representing an object clutter data set for same area shown in FIGS. 1, 2 and 4.
Figure 14:
FIG. 14 is a grayscale counterpart of FIG. 1, namely, a satellite image of the earth encompassing the same example geographic area of interest as that shown in FIG. 1.
Figure 15:
FIG. 15 is a non-color counterpart of FIG. 2, namely, a map showing according to a non-color coding scheme the land use clutter class regions present within the same area shown in FIG. 14.
Figure 16:
FIG. 16 is a non-color counterpart of FIG. 3, namely a legend useful for interpreting the non-color coding scheme used in FIG. 15.
Figure 16:
Figure 16:
Figure 16:
Figure 16:
Figure 16:
Figure 16:
Figure 16:
Figure 16:
Figure 16:
Figure 16:
Figure 17:
FIG. 17 is a non-color counterpart of FIG. 4, namely, a non-color map representing the result of a signal quality analysis carried out for portions of a wireless communication network located within the same area shown in FIGS. 14 and 15 based on the land use clutter classes of FIG. 15.
Figure 18:
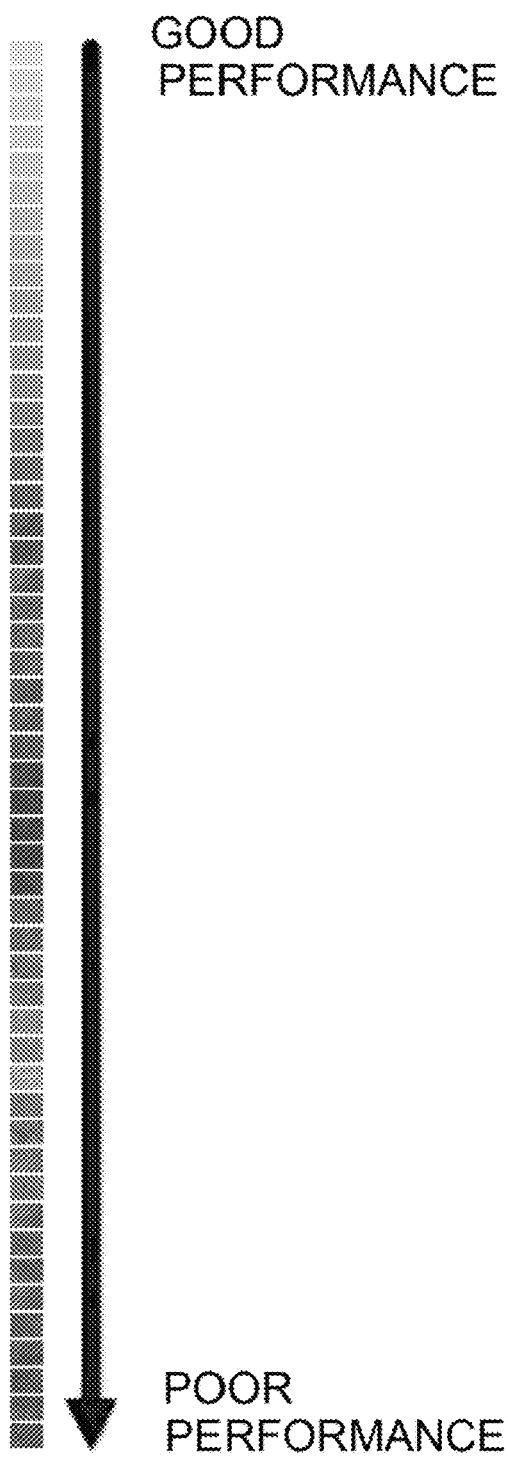
FIG. 18 is a non-color counterpart of FIG. 5, namely, a legend useful for interpreting the non-color coding scheme used in FIG. 17.
Figure 20:
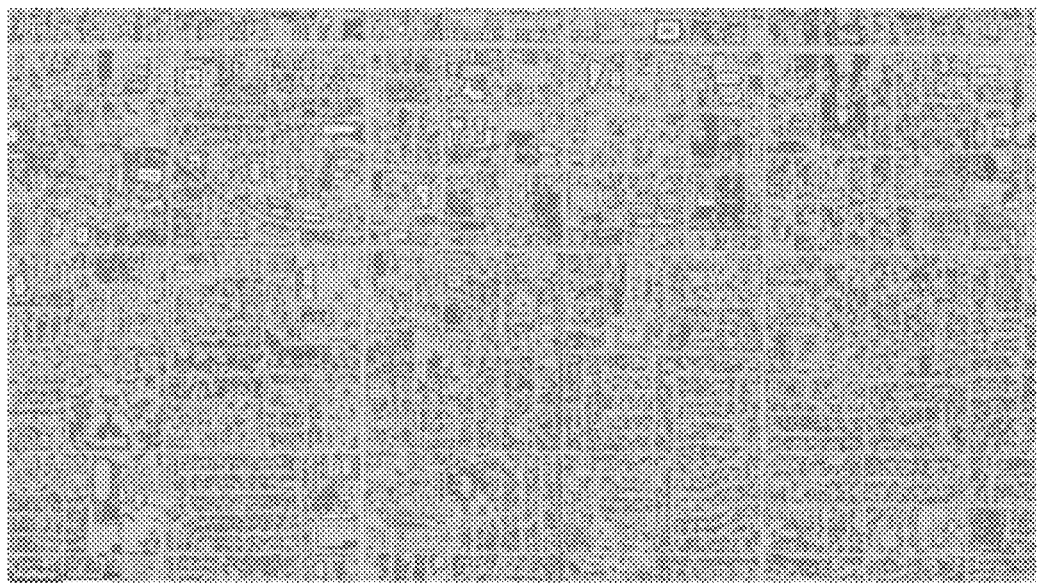
FIG. 20 is a grayscale counterpart of FIG. 12, namely, a grayscale image representing an object clutter data set for same area shown in FIGS. 14, 15 and 17.
Figure 21:
FIG. 21 is a grayscale counterpart of FIG. 13, namely, a grayscale legend useful for interpreting the grayscale coding used in FIG. 20.
Figure 21:
Figure 21:
Figure 21:
Figure 21:
Figure 21:
Figure 21:
Figure 21:
Figure 21:
Figure 21:
Figure 21:

FIG. 12 and FIG. 20 are images representing an object clutter data set 19 for same area shown in FIGS. 1, 2, and 4. FIG. 13 is a legend useful for interpreting the color coding used in FIG. 12 and FIG. 21 is a legend useful for interpreting the non-color coding used in FIG. 20. FIGS. 14, 15 and 17 are non-color counterparts of FIGS. 1,2 and 4, respectively.

In a step 25 an antenna of a radio access network (RAN) asset in a wireless communication network is placed at a location determined based on a result of the signal quality analysis step 21. In certain embodiments, step 25 may comprise, or consist of, the step of specifying a location for an antenna of a radio access network (RAN) asset in a wireless communication network based on a result of the signal quality analysis step 21.

The method 10 results in improved ability to place an antenna of a (RAN) asset at an appropriate location. Measurement of actual local signal strength as compared to signal strength predicted/estimated by analysis carried out using object based clutter characterizations as practiced in the course of carrying out the invention has shown substantial improvement in accuracy as compared to signal strength predicted or estimated based on conventional land use clutter classes.

While the invention has been described with reference to various embodiments, it will be understood by those skilled in the art that changes may be made and equivalents substituted without departing from the scope of the invention.

What is claimed is:

1. A method of placing an antenna of a radio access network (RAN) asset in a wireless communication network, said method comprising the steps of:
    (a) generating a set of object data files based on an aerial view image of an area of the earth, each of said object data files corresponding to a respective type of real world object which is present in said area and is of a set of different types of real world objects capable of influencing propagation of a radio signal within said area, each one of said object data files representing a position of each pixel of a pixel array representing said image, each one of said object data files further representing an association between a subset of said pixels and an affirmative designation, said subset of said pixels including substantially only those of said pixels having a spectral characteristic which meets at least a first criterion, said first criterion being a criterion indicative of a particular one of said types of objects to which said object data file corresponds;
    (b) generating an object clutter data set based on information derived from said object data files according to a hierarchical relative order of said object data files, said clutter data set comprising a clutter raster file representing said position of each said pixel of said array and an object type designation for each said pixel;
    (c) carrying out an analysis in which said object clutter data set is used to represent clutter in said area based on a value quantifying at least one signal propagation parameter, said value being quantified according to said object type designation, said analysis comprising at least one of: a path loss analysis, a signal strength analysis, an interference analysis, and a coverage analysis; and
    (d) physically placing the antenna at a location determined based on a result of said analysis of step (c).

2. A method as claimed in claim 1 wherein said step of generating said set of object data files comprised the substeps of:
    (i) generating, based on said aerial view image of said area of the earth, a set of first raster files in which each pixel in a pixel array of said image is represented, each of said first raster files corresponding to a said respective one of said types of real world objects and including information specifying said position of each said pixel of said array and a value quantifying said spectral characteristic of each said pixel of said array, and
    (ii) generating said set of object data raster files from said set of first raster files based on a said first criterion which is satisfied only if said value of said spectral characteristic is within a range associated with said one of said types of real world objects to which said particular object raster file corresponds.

3. A method as claimed in claim 1 wherein said object type designation is determined by carrying out the substeps of:
    (i) associating a first said object type designation with each said pixel of said array which positionally corresponds to a said pixel associated with a said affirmative designation represented by a one of said object data files which ranks highest according to said a hierarchical relative order;
    (ii) with the exception of any of said pixels associated with said first object designation according to substep (i), associating a second object type designation with each said pixel of said array which positionally corresponds to a said pixel associated with a said affirmative designation represented by a one of said object data files which ranks next highest according to said hierarchical relative order;
    (iii) with the exception of any of said pixels associated with either a first object type designation according to substep (i) or a second object designation type according to substep (ii), associating a third object type designation with each pixel of said array which positionally corresponds to a pixel associated with a said affirmative designation represented by a one of said object data files which ranks third highest according to said hierarchical relative order;
    (iv) for a remaining said object data file, if any, which is nextmost highly ranked according to said hierarchical relative order, associating a corresponding next said object type designation with each pixel of said array which positionally corresponds to a pixel associated with a said affirmative designation of said nextmost highly ranked one of said object data files, with the exception of any of said pixels previously associated with any said object type designation as a result of carrying out any of substeps (i), (ii), or (iii), and (v) repeating substep (iv) unless no said object data file remains with respect to which said substep (iv) has not been carried out.

4. A method as claimed in claim 1 wherein said step of generating said object data set comprises the substep of applying at least one conditional test to effectively disassociate particular ones of said pixels represented in said at least one object data file from said affirmative designation based on a result of said at least one conditional test.

5. A method as claimed in claim 4 wherein said conditional test comprises a neighborhood analysis according to which a probability that a pixel of interest associated with a said affirmative designation according to a given one of said object data files is a pixel representing said type of real world object to which said given one of said object data file corresponds is evaluated based on determining a value correlated to a proportion of said pixels in a group of pixels located within a defined proximity of said pixel of interest are associated with said affirmative designation.

6. A method as claimed in claim 5 wherein said pixel of interest is effectively disassociated from said affirmative designation in the event said value is below a threshold value.

7. A method as claimed in claim 5 wherein said group of pixels located within said defined proximity of said pixel of interest is determined according to a window.

8. A method as claimed in claim 7 wherein said window comprises a seven pixel by seven pixel widow.

9. A method as claimed in claim 4 wherein said conditional test comprises a sieve analysis according to which clusters of said pixels associated with a said affirmative designation according to a given one of said object data files are evaluated with respect to a total area occupied by each respective one of said clusters and all said pixels of each of said clusters which do not satisfy an area threshold condition are effectively disassociated from said affirmative designation.

10. A method as claimed in claim 9 wherein said given one of said object data files is one corresponding to trees as a said real world object and wherein said area threshold condition is one which is not satisfied for any said one of said clusters whose said pixels represent a total area of less than about seventy five square meters.

11. A method as claimed in claim 9 wherein said given one of said object data files is one corresponding to grass as a said real world object and wherein said area threshold condition is one which is not satisfied for any said one of said clusters whose said pixels represent a total area of less than about seventy five square meters.

12. A method as claimed in claim 9 wherein said given one of said object data files is one corresponding to water bodies as a said real world object and wherein said area threshold condition is one which is not satisfied for any said one of said clusters whose said pixels represent an inland lake or pond having a total area of less than about twenty thousand square meters.

13. A method as claimed in claim 9 wherein said given one of said object data files is one corresponding to paved roads as a said real world object and wherein said area threshold condition is one which is not satisfied for any said one of said clusters whose said pixels represent a segment of paved road having a total area of less than about forty thousand square meters.

14. A method as claimed in claim 4 wherein said conditional test comprises a neighborhood analysis followed by a sieve analysis; said neighborhood analysis comprising an analysis according to which a probability that a pixel of interest associated with a said affirmative designation according to a given one of said object data files is a pixel representing said type of real world object to which said given one of said object data file corresponds is evaluated based on determining a value correlated to a proportion of said pixels in a group of pixels located within a defined proximity of said pixel of interest are associated with said affirmative designation; said sieve analysis comprising an analysis according to which clusters of said pixels associated with a said affirmative designation according to a given one of said object data files are evaluated with respect to a total area occupied by each respective one of said clusters and all said pixels of each of said clusters which do not satisfy an area threshold condition are effectively disassociated from said affirmative designation.

15. A method as claimed in claim 1 wherein said view comprises an at least substantially orthogonal view.

16. A method as claimed in claim 1 wherein said image comprises an orthorectified image.

17. A method as claimed in claim 1 wherein said image comprises a true color image and said spectral characteristic comprises color.

18. A method as claimed in claim 1 wherein said image comprises a grayscale image and said spectral characteristic comprises grayscale value.

19. A method as claimed in claim 1 wherein said set of different types of real world objects includes at least, water bodies, tress, grass and buildings and wherein said object data files include at least a water body file, a tree file, a grass file and a building file.

20. A method as claimed in claim 1 wherein said set of different types of real world objects further includes a first inner wall and wherein said set of object data files include a corresponding first inner wall file, said first inner wall file being generated based on said building file by defining said inner wall as a polygon inscribed with an outside boundary of a roof of a building.

21. A method as claimed in claim 1 wherein said set of different types of real world objects further includes a plurality of inner walls and wherein said set of object data files includes a plurality of inner wall files, said plurality of inner wall files including at least a first inner wall file and at least one additional inner wall file, said first inner wall file being generated based on said building file by defining said first inner wall as a first polygon inscribed within an outside boundary of a roof represented by said building file, said at least one additional building inner wall file being generated by defining said additional inner wall as a second polygon inscribed within said first polygon.

22. A method as claimed in claim 1 wherein said set of different types of real world objects further includes bare terrain and wherein said set of object data files include a corresponding bare terrain file as to which said first criterion is one according to which said subset of pixels represented by said bare terrain file as being associated with a said affirmative designation is selected based on said pixels of said subset being those not associated with an affirmative designation by any other of said object data files.

23. A method as claimed in claim 1 wherein said hierarchical relative order, as listed from a highest rank to a lowest rank, is as follows: (i) inner walls, (ii) buildings, (iii) water bodies, (iv) paved roads, (v) trees, (vi) grass and (vii) open land.

24. A method as claimed in claim 23 wherein said building inner walls are successively sub-ranked such that each said building inner wall whose perimeter in located a distance inwardly from an exterior perimeter of a building are sub-ranked higher in said hierarchical relative than a said building inner wall located a lesser said distance inwardly from said exterior perimeter.

25. A method of placing an antenna of a radio access network (RAN) asset in a wireless communication network, said method comprising the steps of:
 (a) generating, based on image of an area of the earth, a first raster file representing an array of pixels derived from said image said first raster file including information specifying a position of each said pixel of said array and a value quantifying a spectral characteristic of each said pixel of said array;
 (b) generating a set of object data files based on said first raster file, each said object data file corresponding to one of a set of different types of real world objects which is present in said area and is of a set of different types of real world objects capable of influencing propagation of a radio signal within said area, each one of said object data files representing said position of each said pixels of said array and an association between a subset of said pixels and an affirmative designation, said subset of said pixels including only those of said pixels whose respective said value quantifying said spectral characteristic meet at least a first criterion indicative of the one of said types of objects to which said particular object data file corresponds;
 (c) generating an object clutter data set based on information derived from said object data files according to a hierarchical relative order associated with said object data files, said clutter data set comprising a third raster file representing said position of each said pixel of said array and an object type designation for each said pixel;
 (d) carrying out an analysis in which said object clutter data set is used to represent clutter in said area, said analysis comprising at least one of: a path loss analysis, a signal strength analysis, an interference and a coverage analysis; and
 (e) physically placing the antenna at the location determined based on a result of said analysis of step (d).

26. A method as claimed in claim 25 wherein said object type designation is determined according to the substeps of:
 (i) associating a first object type designation with each said pixel of said array which positionally corresponds to a said pixel associated with a said affirmative designation represented by a one of said object data files which ranks highest according to said a hierarchical relative order;
 (ii) with the exception of any of said pixels associated with said first object designation according to substep (i), associating a second object type designation with each said pixel of said array which positionally corresponds to a said pixel associated with a said affirmative designation represented by a one of said object data files which ranks object highest according to said hierarchical relative order;
 (iii) with the exception of any of said pixels associated with either a first object type designation according to substep (i) or a second object type designation according to substep (ii), associating a third object type designation with each pixel of said array which positionally corresponds to a pixel associated with a said affirmative designation represented by a one of said object data files which ranks third highest according to said hierarchical relative order;
 (iv) for a remaining said object data file, if any, which is nextmost highly ranked according to said hierarchical relative order, associating a corresponding said object type designation with each pixel of said array which positionally corresponds to a pixel associated with a said affirmative designation of said nextmost highly ranked one of said object data files, excluding any of said pixels previously associated with any said object type designation as a result of carrying out any of the substeps of this claim, and
 (v) repeating substep (iv) unless no said object data file remains with respect to which said substep (iv) has not been carried out.

* * * * *